Jan. 15, 1957  V. I. DUDLEY  2,777,530
OPERATOR CONTROL STATION FOR MINE HAULAGE VEHICLES
Original Filed Oct. 27, 1950  3 Sheets-Sheet 1

INVENTOR:
VICTOR I. DUDLEY.
BY
ATTORNEY.

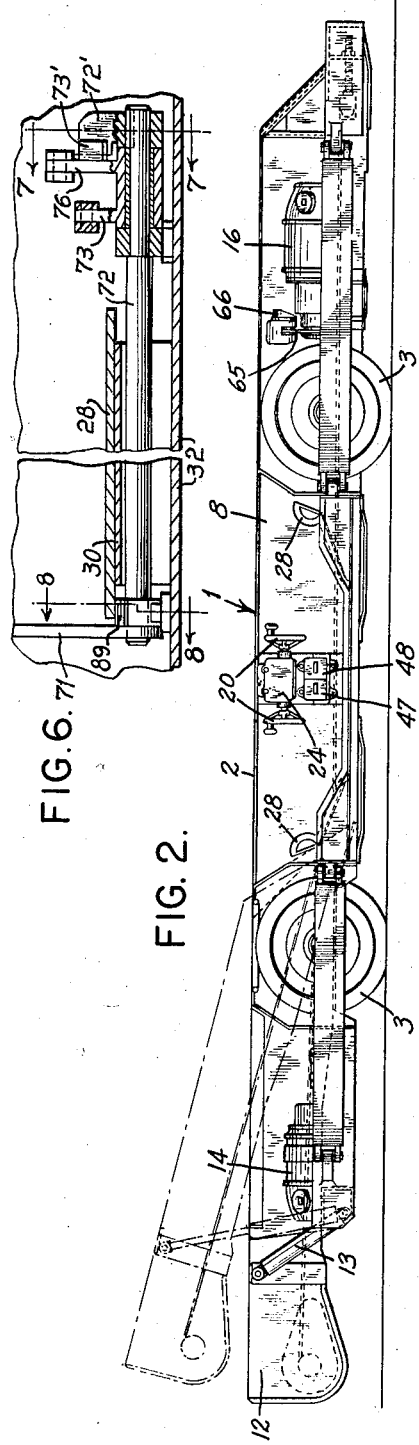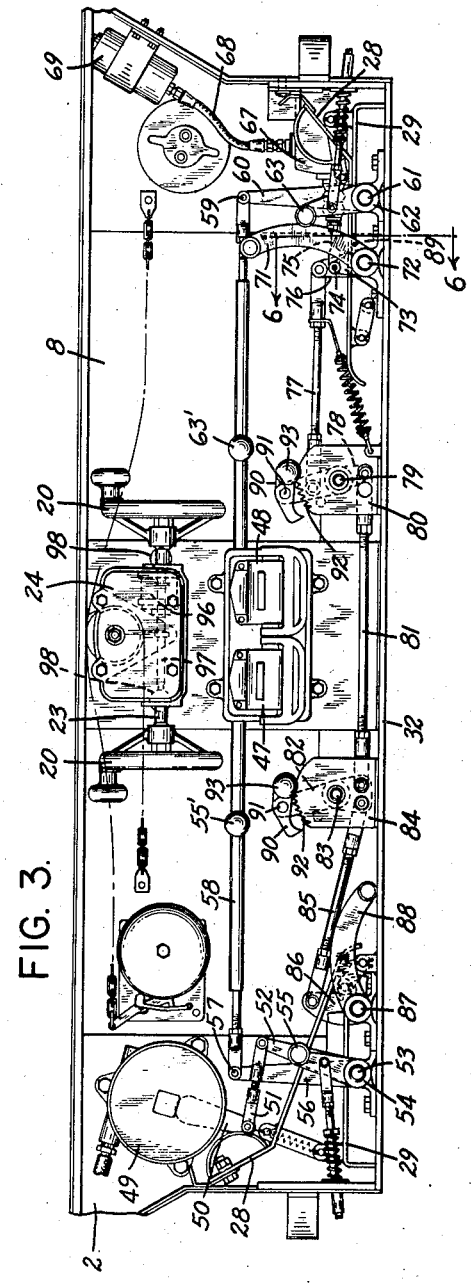

Jan. 15, 1957  V. I. DUDLEY  2,777,530
OPERATOR CONTROL STATION FOR MINE HAULAGE VEHICLES
Original Filed Oct. 27, 1950  3 Sheets-Sheet 3
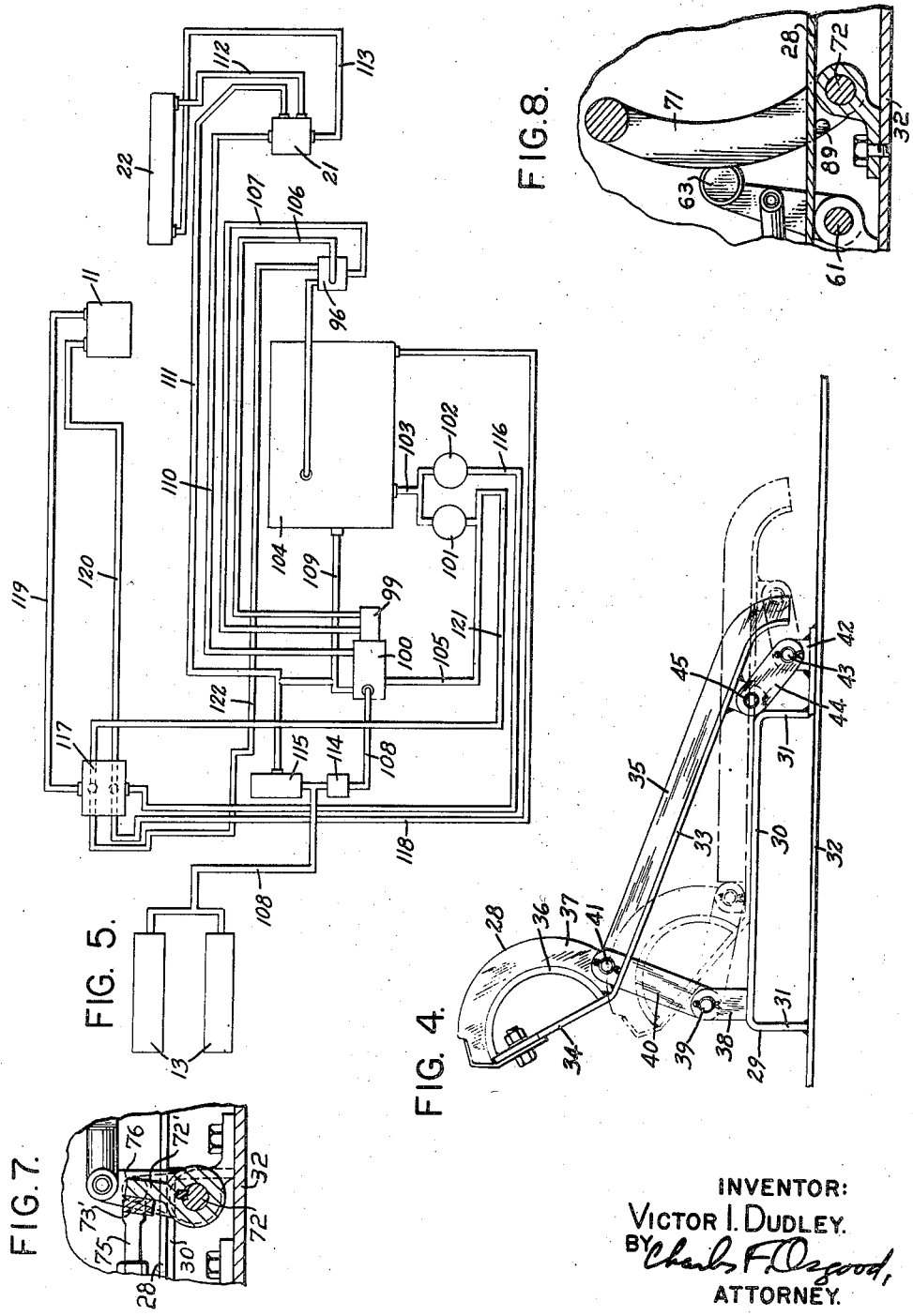
INVENTOR:
VICTOR I. DUDLEY.
BY Charles F. Osgood,
ATTORNEY.

United States Patent Office 2,777,530
Patented Jan. 15, 1957

2,777,530

OPERATOR CONTROL STATION FOR MINE HAULAGE VEHICLE

Victor L. Dudley, Franklin, Pa., assignor to Joy Manufacturing Company, Pittsburgh, Pa., a corporation of Pennsylvania Original application October 27, 1950, Serial No. 192,571, now Patent No. 2,698,104, dated December 28, 1954. Divided and this application May 1, 1953, Serial No. 352,452

16 Claims. (Cl. 180—77)

This invention relates to mine haulage vehicles and particularly to a haulage vehicle of the type known as a shuttle car for conveying loose material such as coal in underground mines wherein the headroom is extremely low.

Heretofore, shuttle cars were not adapted for use in mines having extremely low headroom due to their height and, moreover, due to their relatively short wheel bases, with the ends of the cars overhanging the wheels substantial distances, the cars tended to rock endwise as they traveled over uneven floor surfaces frequently causing the ends of the car to bump the roof in an undesirable manner. Due to the conventional arrangement of the operator's station, the cable reeling mechanism and the driving motors at the ends of the car beyond the sides of the material receiving compartment, it has heretofore been necessary to keep the wheel base relatively short and the ends of the car had substantial overhang and were necessarily wide. The present invention contemplates improvements over known types of shuttle cars in that a car is provided which is extremely low in height especially designed for use in mines having low headroom, and due to the novel arrangement of parts, the wheel base is made relatively long, reducing the overhang without decreasing the overall length of the car, thereby minimizing the undesirable rocking action and the resultant bumping of the roof which particularly might occur in mines having very low headroom. Due to the novel design, the operator's station and the cable reel mechanism are arranged amidships between the wheel axes at the opposite sides of the car body so that it is made possible to reduce the width of the end portions of the car thereby to facilitate maneuvering of the car through the relatively restricted spaces and sharply curved passageways encountered in underground mines. By increasing the wheel base, a longer space has been provided for the operator's station without increasing the overall length of the car and this is desirable since the operator must assume a reclined position on the car due to the low mine headroom, and novel adjustable supports are provided against which the operator may recline in either of reversed positions so that he may readily control and observe the movements of the car during either direction of its travel. A novel arrangement of controls is also provided whereby the car may be readily controlled during either direction of its operation. The improved shuttle car is not only low in height and relatively compact but is also rugged in construction, well adapted for its intended purpose.

An object of the present invention is to provide an improved mine haulage vehicle which, due to its novel design, is especially adapted for use in mines having low headroom. Another object is to provide an improved mine haulage vehicle of the type known as a shuttle car which due to its novel construction may readily negotiate the relatively restricted and sharply curved passageways of an underground mine. Yet another object is to provide an improved shuttle car having a novel arrangement of the operator's station and the cable reeling mechanism amidships of the car between the wheel axes whereby relatively narrow end portions for the car are made possible. A further object is to provide an improved shuttle car having a novel arrangement of the operator's station and improved adjustable supports for the operator whereby the operator may assume a reclined position in a relatively comfortable manner and may readily control and observe the car movements while assuming such reclined position in his station. A still further object is to provide a novel arrangement of controls whereby control of the car from the operator's station is facilitated. Yet another object is to provide an improved shuttle car having novel features of construction and arrangements of parts. These and other objects and advantages of the invention will, however, hereinafter more fully appear.

This application is a division of my copending application Serial No. 192,571, filed October 27, 1950, now matured into Patent No. 2,698,104, dated December 28, 1954.

In the accompanying drawings there is shown for purposes of illustration one form which the invention may assume in practice.

In these drawings:

Fig. 2 is a side elevational view of the shuttle car shown in Fig. 1.

Fig. 3 is a fragmentary enlarged side view of the shuttle car showing the operator's station and the novel grouping of the various controls.

Fig. 4 is an enlarged detail view illustrating an adjustable support for the back of the operator as he assumes a reclined position in his station on the car, the lowered collapsed position of the support being indicated in dotted lines.

Fig. 5 is a diagrammatic view illustrating the hydraulic system.

Fig. 6 is an enlarged transverse vertical section taken on line 6—6 of Fig. 3.

Figure 1:
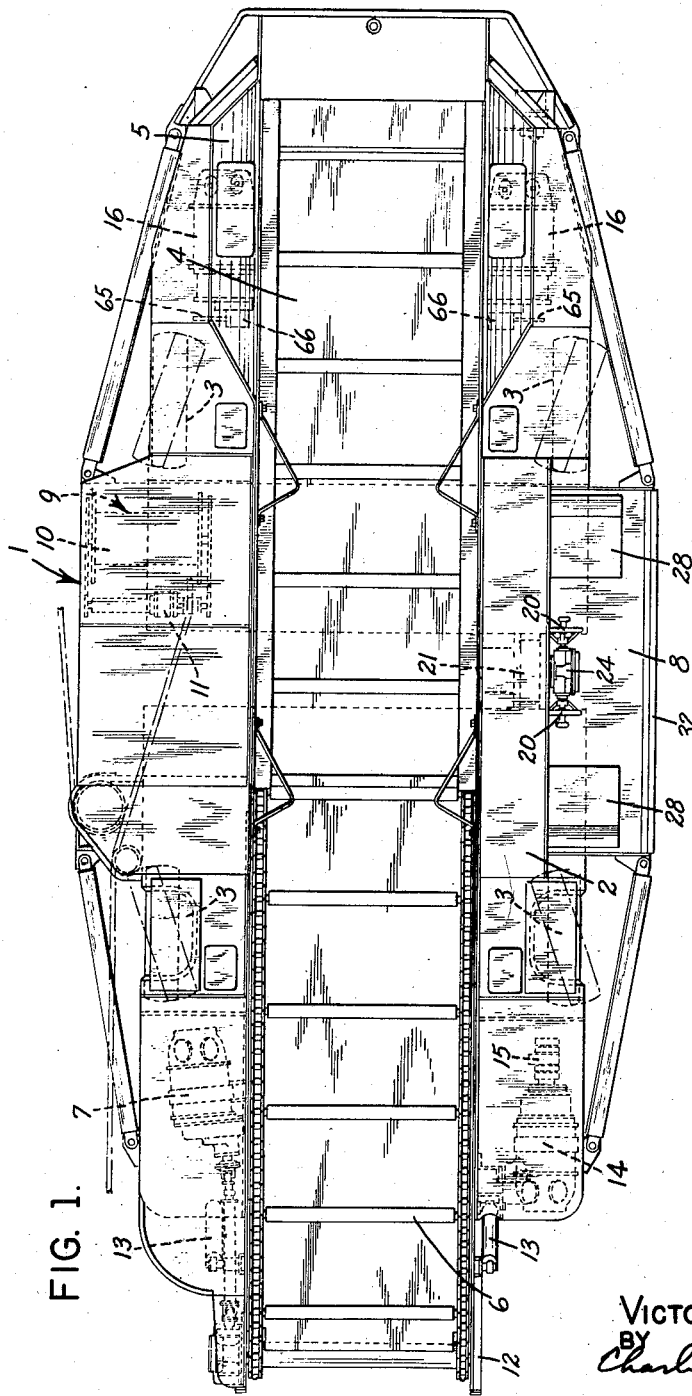
Fig. 1 is a plane view of a shuttle car constructed in accordance with a preferred illustrative embodiment of the invention.

Figs. 7 and 8 are enlarged detail vertical sections taken on lines 7—7 and 8—8 respectively of Fig. 6.

In this illustrative construction, as shown in the drawings, the improved mine haulage vehicle or so-called shuttle car is generally designated 1 and generally comprises a body 2 supported by swivelly mounted propelling and steering wheels 3, and the body has a material receiving compartment 4 provided with a widened hopperlike portion 5 at one end portion of the car. Extending longitudinally along the bottom of the compartment 4 is the top run of a conventional endless flight conveyor 6 driven by a motor 7. Arranged amidships of the car body at the sides thereof between the wheels are spaces, one providing an operator's station 8, and electrical equipment such as a cable reel mechanism 9 is suitably arranged in the other space at the opposite side of the body, and this reel mechanism includes a cable reel 10 driven by a conventional reversible hydraulic motor 11. The conveyor 6 has an adjustable discharge end 12 which may be adjusted by hydraulic jacks 13. A motor 14 drives liquid pumping means 15, and traction motors 16 located at opposite sides of the car body beneath the sides of the hopperlike portion 5 drive the swivelled propelling and steering wheels 3 in all swivelled positions thereof.

The steering mechanism for the shuttle car may be similar to that disclosed in my Patent No. 2,590,300, granted March 25, 1952, and in order that steering of the car may be easily effected by the operator in either of his reclined positions in his station during opposite directions of travel of the car, a pair of oppositely disposed coaxial hand wheels 20 is provided which serves to operate a valve 21 (Figs. 1 and 5) located at the operator's station for controlling flow of liquid under pressure to a steering cylinder 22 (Fig. 5) which is operatively connected through linkage, as described in the patent above referred to, to the pivotal axles for the propelling and steering wheels 3. These hand wheels, which are in effect operator controllable steering wheels, are secured to a horizontal longitudinally extending shaft 23 suitably journaled within a casing 24 secured to the adjacent side of the car body within the operator's station 8. This casing is located substantially midway between the ends of the car body, centrally of the operator's station as shown, so that the hand wheels 20 are within convenient reach of the operator in either of his reclined positions within his station. The hydraulic system which embodies the valve 21 and the steering cylinder 22 will be later referred to.

Arranged in the space provided by the operator's station 8 are adjustable supports 28, 28 in the form of back rests and these supports are located near the opposite ends of the operator's station and are oppositely disposed, as shown in Fig. 2, so that one or the other may be effective to support the shoulders and back of the operator in either reclined position assumed by the operator in his station. Each adjustable support comprises, as shown in Fig. 4, a bottom frame 29 having a horizontal upper portion 30 and bent vertical ends 31 which are secured as by welding to a horizontal platform or plate 32 providing the bottom of the operator's station. A plate or frame 33 has an angularly disposed upper portion 34 and the lower portion of this plate receives a cushion-pad 35 desirably of sponge rubber. The inclined upper portion of the plate has a transverse curved member 36 secured thereto as by welding and this curved member is likewise covered with a cushion-pad 37 of sponge rubber. Vertical lugs 38 secured to the horizontal portion 30 of the frame are pivotally connected at 39 to links 40 which are in turn pivotally connected at their upper ends at 41 to one end of the frame 33. Short lugs 42 secured to the platform 32 are pivotally connected at 43 to relatively short links 44, the latter in turn pivotally connected at 45 to the other end of the frame 33. Thus, the pairs of links 40 and 44 provide a swinging support for the frame 33, and when the links 44 assume their raised rearward position against the frame 29, as shown in Fig. 4, the latter provides stop or abutment means for the links 44 thus to maintain the support in its elevated supporting position. When the links 40 and 44 are swung about their pivots into the dotted line position shown in Fig. 4, the frame 33 is lowered down flat against the horizontal portion 30 of the frame 29. When the support is elevated the back of the operator may rest against the inclined cushion 35 with his shoulders resting against the upper cushion 37 thereby enabling the operator to assume a relatively comfortable reclined position on the platform 32 within his station on the car. When one support is raised other then unused support is lowered into a collapsed position wherein it leaves the forward view of the operator relatively unobstructed.

Again referring to the controls located at the operator's station, it will be noted that arranged just below the gear casing 24 of the steering means, as shown in Fig. 3, is a conventional hand switch 47 for controlling the conveyor driving motor 7 and a conventional safety switch 48 for controlling the circuit to the traction motors 16, in conjunction with a switch 49, for starting, stopping and reversing the traction motors. The switch 49 is provided with dual foot and hand controls comprising a switch actuating lever 50 pivotally connected by an adjustable link 51 to a lever 52 secured to a transverse shaft 53 mounted to turn in bearing brackets 54 secured to the bottom plate or platform 32 of the operator's station. Also secured to the shaft 53 at its outer end is a foot pedal 55. A lever 56 secured to the inner end of the shaft 53 is pivotally connected at 57 to one end of a longitudinally extending operating rod 58 disposed near the inner wall of the operator's station. The opposite end of this rod is pivotally connected at 59 to a lever 60 secured to the inner end of a transverse shaft 61 journaled in bearing brackets 62 secured to the platform 32 near the end of the operator's station opposite from the end at which the shaft and brackets 53 and 54 are located. Secured to the outer end of the shaft 61 is a foot pedal 63. The foot pedals 55 and 63 are conveniently arranged in the operator's station so that they may be operated in either of the opposite reclined positions assumed by the operator in his station. Auxiliary dual hand controls 55' and 63' are secured to the rod 58 (Fig. 3) at opposite sides of the middle portion of the operator's station. Thus, the switch 49 may be readily operated to control operation of the traction motors 16 whenever the safety switch 48 is closed.

The supporting and propelling wheels are provided with conventional hydraulic disc type brakes likewise controlled from the operator's station. These brakes comprise brake discs 65 driven by the traction motors 16 (see Figs. 1 and 2), and cooperating with each disc is a conventional hydraulic cylinder 66. Liquid under pressure may be supplied to the brake operating cylinders from a conventional master cylinder 67 (Fig. 3), and connected to this master cylinder through a conduit 68 is an auxiliary liquid reservoir 69 located in a relatively high position above the master cylinder (see Fig. 3) for maintaining the desired head pressure in the brake fluid system. Again referring to Fig. 3, it will be observed that a foot pedal 71 is secured to a transverse shaft 72 journaled in bearing brackets secured to the platform 32 and a lever 73 journaled on this shaft is pivotally connected at 74 to an operating rod 75 for the master cylinder 67. The pedal 71 may swing freely downwardly relative to the lever 73 into its inoperative position against the platform 32, and when the pedal is swung upwardly into its operative position an abutment 72' rotatable with the shaft 72 may engage an abutment 73' on the lever 73, so that the pedal may swing the lever, to actuate the rod 75. To provide a dual control for the brakes within the operator's station, the lever 73 has a lever 76 connected thereto which is in turn connected by a rod 77 to a lever 78 pivoted at 79 on a bracket 80 mounted on the platform 32. The lever 78 is pivotally connected to a rod 81 extending along the inner side of the operator's station to a lever 82 pivotally mounted at 83 on a similar bracket 84, and this lever is connected by a rod 85 to a lever 86 journaled on a transverse shaft 87 rotatably mounted at the opposite end of the operator's station from the end at which the shaft 72 is located. Secured to the shaft 87 is a foot pedal 88, and this pedal, like the pedal 71, when in raised operative position, may turn an abutment connected to the shaft 87 and engageable with an abutment on the lever 86. Thus the pedal 88 may be freely swung down against the platform when not in use. Evidently either pedal may be used to operate the master cylinder 67, and either may be swung into an inoperative position down against the platform. The pedal 88 is shown in Fig. 3 in its lowered inoperative position down against the platform 32, while the other pedal at the opposite end of the operator's station is held up in its operating position by a pin 89 on the lever engaged by the overlying plate 33 of the adjacent lowered adjustable support 28, in the manner shown. Thus, when the operator's back-support is lowered the foot pedal 71 is maintained in the elevated position shown so that it may be conveniently operated by the operator. The pedal 88 has a similar pin which when the pedal is raised is engaged by the overlying lowered support of the other back-support. Counter-weighted dogs 90 pivoted at 91 at the upper ends of the levers 78 and 82 respectively, are engageable with ratchet teeth 92 on the upper portions of the brackets 80 and 84, for positively holding the brakes in applied position. The counter-weights 93 of these dogs normally maintain the latter in released position out of engagement with the ratchet teeth, and the dogs must be manually swung by the operator into positions to engage the teeth. Thus, the hydraulic brakes may be readily controlled by the operator in either of his reclined positions in his station. It will be noted that the various levers and operating rods are provided with usual coil retracting springs for returning the controls to their inoperative positions when released by the operator and since such springs are conventional, detail description thereof is not given.

Also arranged in the operator's station is a conventional remote control valve 96 (Figs. 3 and 5) having an operating rod 97 provided with operating handles 98 (Fig. 3). This remote control valve controls flow of liquid under pressure to a servomotor 99 (Fig. 5) for actuating a conventional elevating control valve device 100 which in turn controls the flow of liquid under pressure to the elevating jacks 13 for the tiltable discharge end 12 of the conveyor. By the provision of the remote control valve 96 located at the operator's station and the servomotor actuated control valve device 100 for the elevating jacks, it is possible to locate a relatively small, compact valve at the operator's station with small control conduits leading from the operator's station and extending along one side of the vehicle body to the servomotor, and also to locate the large elevating valve device 100 at any desired position on the car body outside of the operator's station.

The hydraulic system is shown diagrammatically in Fig. 5, and the pumping means 15 comprises separate pumps 101 and 102 driven in unison by the motor 14 and having their suction sides connected by a conduit 103 to a liquid tank 104. The discharge of the pump 101 is connected by a conduit 105 to the elevating control valve device 100. The remote control valve 96 is connected by conduits 106 and 107 to the servomotor 99 whereby liquid may be conducted thereto and discharged therefrom to effect location of the valve element of the valve device 100 in the desired position. Leading from the elevating valve device 100 is a conduit 108 connected to the elevating jacks 13, and a return conduit 109 connects the elevating valve device back to the tank 104. Also leading from the valve device 100 is a supply conduit 110 connected to the steering valve 21, and a discharge conduit 111 leads from the steering valve to the return conduit 109 connected to the tank. The steering valve 21 is connected by conduits 112 and 113 to the opposite ends of the steering cylinder 22 of the steering gear. A conventional check valve device 114 in the conduit 108 leading to the elevating jacks permits flow of liquid under pressure to the elevating jacks and provides restricted discharge of liquid from the jacks when the valve element of the valve device 100 is positioned to connect the conduit 108 to the return conduit 109. A conventional safety valve 115 connected to the conduit 108 is set to open at a predetermined pressure thereby to prevent excessive pressure in the jack supply line. The discharge side of the pump 102 is connected by a conduit 116 to a valve device 117 of a type well known to those skilled in the art, for controlling the motor 11 of the cable reel 10 whereby the reel may be driven in winding direction and may rotate in unwinding direction, either with or without predetermined resistance, and a return conduit 118 leads from the valve device 117 back to the tank 104. Conduits 119 and 120 connect the valve device 117 to the opposite sides of the reversible reel motor 11. The discharge side of the pump 101 is also connected by a conduit 121 to the reel control valve 117. Liquid under pressure may be supplied from the reel control valve to the remote control valve 96 through a conduit 122. The reel control valve does not per se enter into the present invention and needs no further detailed discussion other than to state that the liquid for operating the servomotor 99 is taken from the reel motor control. Since the general mode of operation of a shuttle car of the type disclosed is well known to those skilled in the art, a description of the mode of operation thereof appears unnecessary to the proper understanding of the invention.

As a result of this invention, an improved material haulage vehicle is provided which is extremely low in height especially designed for use in underground mines having relatively low headroom and the vehicle, due to its novel design, substantially eliminates the usual endwise bouncing or rocking tendency such as is encountered in conventional shuttle cars, as it travels over an uneven floor surface, thereby avoiding frequent bumping of the mine roof so that the car may be efficiently operated under low headroom. The shuttle car is not only low and compact but due to its novel shape it is possible readily to negotiate sharply curved and restricted passageways such as are encountered in an underground mine. By the provision of a car having a relatively long wheel base, much longer than that of a conventional shuttle car, it is possible to locate the spaces for the electrical equipment and the operator's station amidships of the car and intermediate the front and rear wheels, and to substantially reduce overhang of the ends of the car beyond the wheels without decreasing the overall length of the car. The novel dual control arrangement and its novel location within the operator's station provides convenience in control and the improved adjustable supports for the operator enables him to assume a relatively comfortable reclined position in his station during either direction of travel of the car. These and other advantages of the invention will be clearly apparent to those skilled in the art.

While there is in this application specifically described one form which the invention may assume in practice, it will be understood that this form and modification thereof are shown for purposes of illustration and that the invention may be modified and embodied in various other forms without departing from its spirit or the scope of the appended claims.

What I claim as new and desire to secure by Letters Patent is:

1. In a vehicle of the character disclosed, means providing an operator's station having a supporting structure including a bottom platform and of sufficient length to accommodate an operator in a reclined position in said station, a shiftable supporting means mounted on said platform and located within said station near one end thereof against which the operator may rest when he assumes such reclined position on said platform, said shiftable supporting means including a movable back rest and pairs of links connected to said supporting structure and to said back rest for supporting the latter for swinging movement between its lowered inoperative position near the platform of the operator's station and its elevated supporting position wherein the operator may rest thereagainst, and stop means provided by said supporting structure for limiting movement of said back rest in either shifted position thereof.

2. In a reversible vehicle of the character disclosed, means providing an operator's station and having a platform disposed in a relatively low position on the vehicle and of sufficient length to accommodate an operator in opposite reclined positions in said station during opposite directions of travel of the vehicle, shiftable supporting means mounted on said platform in the operator's station near its opposite ends for supporting the shoulders of the operator in either of his opposite reclined positions on said platform, said supporting means each embodying a supporting plate against which the operator's shoulders may rest and supporting and elevating means for said plate for raising the latter into its elevated operative supporting position while the then unused supporting plate at the other end of the station is collapsed and remains lowered close to said platform, said plate when lowered providing a relatively free view in advance of the operator, and controlling means for the vehicle including dual control elements located near the opposite ends of the operator's station and means for interconnecting said control elements so that either may readily be used to control the vehicle when the operator assumes either of his opposite reclined positions in said station, said control elements swingable between a lowered inoperative position close to said platform and a raised operating position, and either of said shiftable supports when in its lowered inoperative position engaging an element on said raised control element to prevent undesired movement of the latter toward its lowered position.

3. A vehicle of the character disclosed having a body providing an operator's station the horizontal bottom of which is disposed in a relatively low position on said body and is of sufficient length to accommodate an operator in a reclined position on said horizontal bottom, a shiftable supporting means arranged in said station on said horizontal bottom against which the operator may rest when he assumes such reclined position in said station, said supporting means including a movable back rest and pairs of supporting links of unequal length pivotally supported by said bottom of the operator's station and operatively connected to said back rest for supporting the latter, and said links swingable about their pivots to locate said back rest either in a lowered horizontal inoperative position close to the station-bottom or in an inclined raised operative position above said station-bottom, and abutment means, said shorter links when said plate is raised assuming a locking position in engagement with said abutment means to lock said back rest against undesired lowering movement.

4. A reversible low-height vehicle of the character disclosed comprising means providing an operator's station disposed below the top of the vehicle and having a bottom platform on which the operator may assume a reclined position, said station being of sufficient length to accommodate an operator in opposite reclined positions on said platform during opposite directions of travel of the vehicle, and control means for the vehicle disposed in the operator's station below the top of the vehicle and including dual control pedals arranged in the operator's station near its opposite ends respectively, means for interconnecting said pedals so that either pedal may be used to effect control of the vehicle whereby the operator may control the vehicle by a foot in either of his opposed positions in said station, and auxiliary hand control elements carried by said interconnecting means and located at opposite sides of a point midway between the ends of said station so that the operator may manually control the vehicle independently of said pedals in either reclined position assumed by the operator on said station-platform.

5. A reversible vehicle of the character disclosed comprising means providing an operator's station having a bottom platform and of sufficient length to accommodate an operator in opposite reclined positions on said platform during opposite directions of travel of the vehicle, and braking means for the vehicle including dual control pedals arranged in the operator's station near its opposite ends, means for interconnecting said pedals so that either pedal may be used to effect braking of the vehicle, and means for positively holding said pedals in operating position including pivoted dogs carried by elements of said interconnections and engaging relatively stationary ratchet teeth, said dogs being located in the operator's station at opposite sides of a point midway between the ends of said station so that the operator may manipulate said dogs in either of the reclined positions assumed by him on said station-platform.

6. A reversible vehicle of the character disclosed having pairs of front and rear supporting and propelling wheels adapted to travel over a mine floor for propelling the vehicle during its travel in either of opposite directions, means providing an operator's station longitudinally at one side of the vehicle below the top of the latter and having its bottom located in a relatively low position on the vehicle and of sufficient length to accommodate an operator in opposite reclined positions on the station-bottom during opposite directions of travel of the vehicle, reversible electric traction motors for driving said wheels, a switch for controlling starting, stopping and reversal of said traction motors, and operating means for said switch including dual control pedals arranged in said operator's station near its opposite ends, means for interconnecting said pedals so that either pedal may be used to effect control of said switch, and auxiliary hand control elements carried by said interconnecting means and located at opposite sides of a point midway between the ends of said station so that said switch may be manually controlled independently of said pedals, whereby said switch may be operated either by foot or by hand in either reclined position assumed by the operator in his station.

7. A reversible vehicle of the character disclosed having pairs of front and rear supporting and propelling wheels adapted to travel over a mine floor for propelling the vehicle during its travel in either of opposite directions, means providing an operator's station longitudinally at one side of the vehicle below the top of the latter and having a horizontal bottom disposed in a relatively low position on the vehicle and of sufficient length to accommodate an operator in opposite reclined positions on said station-bottom during opposite directions of travel of the vehicle, reversible traction motor means for driving said wheels, a control device for controlling starting, stopping and reversal of said traction motor, and operating means for said control device including dual control pedals arranged in said operator's station near its opposite ends, means for interconnecting said pedals so that either pedal may be used to effect actuation of said control device whereby the operator may operate said control device in either reclined position assumed by him in his station, and auxiliary hand control elements operatively associated with said interconnecting means whereby said control device may be operated independently of said pedals in either reclined position assumed by the operator in his station.

8. In a vehicle of the character disclosed, means providing an operator's station and having a supporting surface shiftable supporting means mounted on said supporting surface and against which the operator in said station may rest during operation of the vehicle, said supporting means embodying a movable support member, and controlling means for the vehicle including a control element in said operator's station so that the operator may control the vehicle, said control element movable between inoperative and operative positions, said movable support member when in lowered inoperative position close to said supporting surface cooperating with said control element whereby the latter is precluded from movement toward its inoperative position.

9. In a vehicle of the character disclosed, means providing an operator's station, braking means for the vehicle, dual control elements arranged at different locations within the operator's station, means for interconnecting said control elements so that either control element may be used to effect operation of said braking means to brake the vehicle, and means for positively holding either of said control elements in operating position operatively associated with said interconnecting means including a releasable holding device, and shifting elements for said holding devices so that the operator may operate the latter from either of said different locations within said station.

10. A reversible vehicle of the character disclosed having pairs of front and rear supporting and propelling wheels adapted to travel over a mine floor for propelling the vehicle during its travel in either of opposite directions, means providing an operator's station longitudinally at one side of the vehicle below the top of the latter and having a horizontal bottom disposed in a relatively low position on the vehicle and of sufficient length to accommodate an operator in opposite reclined positions on said station-bottom during opposite directions of travel of the vehicle, motor operated means for driving said wheels, braking means for said wheels, and operating means for said braking means including dual control pedals arranged in said operator's station near its opposite ends, means for interconnecting said pedals so that either pedal may be used to effect actuation of said braking means whereby the operator may operate said braking means in either reclined position assumed by him in his station, and means providing relative motion between said pedals and said interconnecting means so that either pedal may be swung from a raised operating position to a lowered inoperative position, the pedal in said latter position disposed down against the bottom of said station.

11. In a vehicle of the character disclosed, means providing a space having a horizontal platform at its bottom, said space providing an operator's station on the vehicle, a support for an operator assuming a reclined position on the platform in said space, movable supporting means mounted on said platform and carrying said support, said supporting means supporting said support for movement between a raised operative position and a lowered inoperative position in said space, said support when lowered lying close to the top of the platform, an abutment means on said platform and with which said support engages for limiting the lowering movement of said support, said supporting means when said support is in its raised operative position maintaining said support in an upwardly and rearwardly inclined position to provide a rest for the shoulders of the operator reclining on the platform in said space.

12. A vehicle as set forth in claim 11 wherein control means for the vehicle is arranged in said space in a position to be manipulated by the operator from his reclined position on said platform, said control means including a movable control element having means engaged by said support when the latter is lowered for maintaining said control element in its raised operative position, said control element when said support is raised being free for movement into its lowered inoperative position down against the platform.

13. A vehicle as set forth in claim 12 wherein said means on said control element engaged by said support when said control element is in its raised operative position comprises a pin on said control element, said support overlying and engaging said pin when said support is in lowered inoperative position to maintain said control element in such operative position.

14. A vehicle as set forth in claim 11 wherein said movable supporting means for said support comprises pivoted links disposed out of parallelism for effecting tilting of said support as the latter swings upwardly towards raised position, said links causing said support to move bodily rearwardly as it is tilted upwardly, and abutment means on said platform and engageable by the forward links for maintaining said support in its raised inclined position.

15. A vehicle as set forth in claim 14 wherein the rear links are longer than the front links, and said shorter links engage said abutment means when said support is in raised inclined position.

16. A vehicle as set forth in claim 15 wherein said abutment means provides an elevated horizontal surface above said platform and against which the bottom of said support rests when said support is in its lowered inoperative position.

References Cited in the file of this patent

UNITED STATES PATENTS

| | | |
|---|---|---|
| 367,053 | McCurdy | July 2, 1887 |
| 2,226,027 | Stoner | Dec. 24, 1940 |
| 2,298,448 | Arentzen | Oct. 13, 1942 |
| 2,399,619 | Beck | May 7, 1946 |
| 2,488,520 | Beck | Nov. 22, 1949 |
| 2,494,324 | Wright | Jan. 10, 1950 |
| 2,529,192 | Rossner | Nov. 7, 1950 |
| 2,590,300 | Dudley | Mar. 25, 1952 |
| 2,593,643 | Woolf | Apr. 22, 1952 |
| 2,650,372 | Lowe | Sept. 1, 1953 |
| 2,698,104 | Dudley | Dec. 28, 1954 |

FOREIGN PATENTS

| | | |
|---|---|---|
| 480,979 | France | July 25, 1916 |
| 148,365 | Great Britain | Nov. 25, 1920 |